3,180,700
PROCESS FOR PREPARING LITHIUM
ALUMINUM HYDRIDE
Gene C. Robinson, Baton Rouge, La., assignor to Ethyl Corporation, New York, N.Y., a corporation of Virginia
No Drawing. Filed Sept. 26, 1961, Ser. No. 140,676
2 Claims. (Cl. 23—14)

This invention relates to the manufacture of lithium aluminum hydride. More particularly, the invention relates to the manufacture and recovery of a white, crystalline, high purity form of lithium aluminum hydride.

Lithium aluminum hydride has achieved considerable importance as a highly effective reducing agent for organic chemicals, particularly for reducing compounds having an unsaturated linkage, without attack of such linkage. An additional use is as a drying agent, to remove residual traces of water from various organic chemicals. For many purposes, lithium aluminum hydride is superior to other alkali metal alumino hydrides such as sodium aluminum hydride.

Prior methods of making this product were cumbersome and expensive. The prior method has involved first forming lithium metal, by electrolysis of lithium chloride. The metal is then hydrided, and the hydride is reacted with aluminum chloride, according to the equation $$4LiH + AlCl_3 \rightarrow LiAlH_4 + 3LiCl$$

It is seen that the former procedure requires four moles of lithium hydride for each mole of product. In addition, it is found difficult to isolate a high purity crystalline product, because of the relative solubility of the lithium chloride joint product, and aluminum chloride (if not fully reacted), in the reaction media employed. A significant need has existed, then, for an efficient process for the manufacture of lithium aluminum hydride, and particularly for a process which does not involve concurrent formation of lithium chloride, which necessarily requires isolation, recovery, and reprocessing of this expensive compound. Even more particularly, a need has existed for such a process from which crystalline lithium aluminum hydride, of high purity, is recoverable as relatively uniform, free flowing crystals.

The object of the invention is, then, to provide a new and improved process for the manufacture of lithium aluminum hydride. Another object is to provide such a process which does not require lithium hydride as a starting material. An additional and specific object is to provide in combination, such a synthesis and a highly efficient recovery operation producing a high purity crystalline product.

The present invention comprises reacting together sodium aluminum hydride and lithium chloride, in a diethyl ether reaction medium. A solution of lithium aluminum hydride in the diethyl ether is formed, and sodium chloride solids are precipitated. A supplemental solvent, of higher boiling point than the diethyl ether, is added to the solution, being miscible with the diethyl ether, but a non-solvent for the lithium aluminum hydride. At least a portion of the diethyl ether is then evaporated while the solution is maintained as crystallizing conditions. A crop of lithium aluminum hydride crystals is formed and filtered from the non-evaporated solution.

In the synthesis, the sodium aluminum hydride and lithium chloride are usually charged in approximately equimolal proportions. For example, molal ratios of sodium aluminum hydride to lithium chloride, of from about 0.9:1 to 1.1:1 are customary. It is preferred to provide the sodium aluminum hydride in slight excess, say in the proportions of about 1.01 to 1.07 moles per mole of lithium chloride. The sodium aluminum hydride is substantially insoluble in diethyl ether, whereas lithium chloride exhibits low to moderate solubility. The slight excess of sodium aluminum hydride facilitates forming a product solution relatively free of impurities, particularly of lithium chloride. Surprisingly, even though the sodium aluminum hydride is virtually insoluble in diethyl ether, the desired synthesis reaction occurs rapidly and efficiently according to the equation $$LiCl + NaAlH_{4(s)} \rightarrow NaCl_{(s)} + LiAlH_{4(solution)}$$

In the crystallization and recovery portion of the process, the lithium aluminum hydride solution is admixed with a quantity of the supplemental liquid, which includes dialkyl ethers of higher molecular weight than the diethyl ether, or a hydrocarbon of lower volatility than the diethyl ether. The supplemental liquid can be a single compound selected from the foregoing group, or a mixture of two or more of such components. The proportions employed are not highly critical, but can be as low as about ¼ ml. per ml. of solution, or up to or above the limit of miscibility of the liquid with the lithium aluminum hydride solution.

A preferred basis for the proportions of crystallizing additive is on the basis of the lithium aluminum hydride content of the feed soltuion from the synthesis step. The concentration of the lithium aluminum hydride is subject to wide variation, as it is highly soluble in the diethyl ether predominating in the synthesis reaction medium. Hence, supplying the supplemental liquid to the crystallizing operation in proportions of from 3 to 10 ml. per gm. of lithium aluminum hydride, is the preferred operating procedure.

After adding some or all of the supplemental liquid to the solution from the synthesis step, at least a portion of the diethyl ether content is then evaporated, causing formation of lithium aluminum hydride crystals which are then recovered, preferably washed, and dried.

Numerous variations of the process details are permissible. The working examples following and the further description given hereinafter illustrate certain of the permissible variations in the invention and certain of the embodiments thereof.

*Example 1*

Dry lithium chloride and sodium aluminum hydride were charged to a reactor, in the proportions of 1.03 moles sodium aluminum hydride per mole of lithium chloride, along with dry diethyl ether in the proportions of about 6 ml. per gm. of the sodium aluminum hydride. The reactor was heated to 50° C., and the contents agitated, these reaction conditions being maintained for a period of four hours. The reaction was then terminated, by cooling the reactor and contents to ambient temperature. The reactor included solids, consisting essentially of sodium chloride, which were separated by filtration. Analysis of an aliquot portion of the filtrate showed that it contained, in solution, lithium aluminum hydride amounting to 80 percent yield based on the lithium chloride.

A lithium aluminum hydride solution, prepared as above described was then mixed with di-n-butyl ether and dry toluene, in the proportions of .46 and .25 volume, respectively, per volume of the original solution. Alternatively expressed, these liquids were fed in proportions of 3.6 and 2.0 ml., respectively, per g. of the lithium aluminum hydride in the original solution.

The liquid mixture was charged to a crystallizer, and vacuum distilled at a low rate, while maintaining gentle agitation. The distillation was carried out at about ⅓ atmosphere pressure, the temperature being initially about 25° C. and 35° C. after several hours. The distillate amounted to a volume of over 90 percent of the original lithium aluminum hydride solution, and consisted predominantly of diethyl ether.

In the crystallizer, a crop of pure white crystals was produced. There were filtered from the liquid, washed with toluene and petroleum ether and dried under vacuum. A crystal recovery of 93–94 percent of the original lithium aluminum hydride was achieved. The crystals were needle like in form, of relatively uniform size, and up to about 1 mm. in length. Analysis showed a purity of about 98 percent.

Additional purification operations are given in the following table, again using, as feed, lithium aluminum hydride prepared in diethyl ether as described above.

The solution was then filtered and a trace of previously prepared lithium aluminum hydride crystals (less than 1 percent of the dissolved material) was added. A crystallization was carried out at about 35° C. The pressure in this several hour period initially was at about one-fourth atmosphere and, finally, 0.06 atm.

A total recovery of about 90 percent of the original dissolved lithium aluminum hydride, of about 98 percent purity, was recovered as pure white, needle-like crystals.

Many variations in the mode of recovery operations are permissible. In large scale operations, the mother liquor from the crystallizer is returned for re-use, and for retention of the non-crystallized lithium aluminum hy-

| Example | Feed Solution, g. LiAlH₄/100 ml. ether soln. | Additive | | Crystallization | | | | Product | | Yield |
|---|---|---|---|---|---|---|---|---|---|---|
| | | Identity | Ml./ml. solution | Temp., °C. | Press., Atm. | Percent distilled [1] | Time, Hr. | Purity percent | Form | |
| 2 | 9.3 | Di-n-butyl ether. | 1.0 | 25 to 10 | 0.03 to 0.07. | About 100. | [2] | Approx. 98%. | Lustrous white needles. | 77%. |
| 3-A | 12.8 | Toluene | 0.5 | 25 to 43. | 0.16 to −0.37 | 100 | 10 | Approx. 98%. | Needles up to 1 mm. | 48. |
| 3-B | 12.8 | Toluene | 0.91 | 25 to 40 | 0.16 to −0.37 | 100 | 6 | Approx. 98%. | Needles up to 1 mm. | 85. |
| 4 | 15 | Isoamyl ether | 1.0 | 30 to 35 | 0.2 to 0.5. | 90 | 4 | High | | High. |
| 5 | 20 | Isopropyl ether. | 1.3 | 25 to 35 | 0.2 to 0.4. | 100 | 5 | High | | High. |
| 6 | 16 | 2,2,3-trimethyl pentane. | 0.95 | 25 to 35 | 0.2 to 0.5. | 85 | 11 | High | | Low-two phase form. |

[1] Percent distilled = volume of distillate as percent of volume of feed solution.
[2] Chrystallization period interrupted by overnight storage.

In certain cases, when at least a part of the crystal product is desired as relatively large crystals, a stepwise procedure is advantageously followed in removing the diethyl ether, as shown in the following example.

*Example 7*

In this operation, the feed solution contained approximately 16 gm. per 100 ml. of solution in diethyl ether. To this solution, in a crystallizing vessel, was added dry benzene in volumetric proportions of 1.16 per volume of the feed solution, this corresponding to the saturation limit. The benzene amounted to about 7.1 ml. per gm. of dissolved lithium aluminum hydride. Previously prepared solid lithium aluminum hydride, amounting to about 4 percent of the dissolved lithium aluminum hydride, was then added, and the mixture was heated to 45° C. The mixture was then subjected to low pressure, of about one-half atmosphere and some of the solvent ether was thus vaporized, thereby cooling the solution to about 30° C. The heating, then cooling by vaporizing, cycle was repeated several additional times, until the total distillate, largely diethyl ether, amounted to slightly over 100 percent of the original solution charge. Crystal formation occurred during each cycle. The crystals were separated, washed with benzene and petroleum ether, and dried under vacuum. A recovery of over 95 percent, including both the original lithium aluminum hydride and the addition for seed, was obtained. Screening of the crystals gave a fraction of over 50 percent retained on a 70 mesh sieve. The second fraction was of very fine crystals, of less than 200 microns in size. The first of these portions was free of any chloride impurities. Both fractions analyzed 98 percent or better lithium aluminum hydride.

*Example 8*

In this operation, the original charge contained about 6.1 g. per 100 ml. of diethyl ether solution. Dry di-n-butyl ether was mixed with the solution in proportions of about 0.25 ml. per ml. of solution (4 ml. per gm. of lithium aluminum hydride in solution). The mixture was then heated at a temperature of 20° C., rising to 35° C., the absolute pressure ranging from 0.34 to .26 atmosphere. A distillate of about one-half the volume of the original feed solution had been distilled, and some crystals were formed.

dride. The vaporized material from the crystallizer is largely diethyl ether, but also contains moderate quantities of the liquid added in the crystallizing step. Fortunately, the presence of moderate concentrations of the higher alkyl ethers, or aromatic or alkane hydrocarbons, is not damaging to the efficiency of the synthesis operation preceding the recovery operations. In a fully integrated process, the vapors flashed from the crystallizing step are recirculated to the synthesis reactor, and the mother liquor from the final filtration is returned to the crystallizer.

In addition to the additive or crystallizing liquids specifically illustrated above, many others can be used with good efficiency. For example, the xylenes, 2,2,3-trimethyl pentane, ethyl benzene, 2 methyl heptane, nonane, and highly refined paraffinic petroleum fractions can be substituted for the additives employed in Examples 1 to 8 above and good results will be achieved. These supplemental liquids may exhibit some solvency for the lithium aluminum hydride, but less than does diethyl ether, the principal liquid component of the synthesis mixture, the liquid phase of which is the feed to the crystallizing operation.

The precise temperature and pressure conditions of the crystallizing step are not highly critical but are important in effecting the speed of operation and the size of crystals produced. Commercial crystallizers of the continuous type quite readily produce large crystals averaging 2 mm. in size or larger. The temperatures are preferably in the range of 20 to 60° C., the higher temperatures being reached at the end of a crystallizing cycle when most of the diethyl ether has been stripped from the solution. The terminal temperature is effected by the boiling point of the additive liquid employed, and the pressure of operation, which are preferably in the range 0.05 up to slightly less than one atmosphere.

Considerable latitude is permissible, as already indicated, in the precise conditions employed in the first, or synthesis step. The operating temperature can be as low as 5 to 10° C., but ordinarily this is avoided, and a preferred temperature range is about 35 to 75° C. Even higher temperatures are permissible, but generally do not provide profound benefits. When the higher temperatures are used, appropriate design features are included in the reactor to compensate for the vapor pressure of the diethyl ether of the system.

What is claimed is:

1. The process of manufacture and recovery of crystalline lithium aluminum hydride comprising reacting together lithium chloride and sodium aluminum hydride in a reaction medium of diethyl ether, the sodium aluminum hydride being insoluble in the diethyl ether and the reaction being at a temperature of from about 5 to 75° C., forming thereby a solution of lithium aluminum hydride and sodium chloride solids, separating this solution and the solids, then adding a liquid having a higher boiling point than diethyl ether and selected from the group consisting of dialkyl ethers, aromatic hydrocarbons and alkane hydrocarbons to the said solution and evaporating at least a portion of the resultant mixture at sub-atmospheric pressure and forming thereby lithium aluminum hydride crystals and recovering said crystals.

2. The process of manufacture and recovery of crystalline lithium aluminum hydride comprising feeding together sodium aluminum hydride and lithium chloride in the proportions of from about 1.01 to about 1.07 moles of sodium aluminum hydride per mole of lithium chloride, and dry diethyl ether, the sodium aluminum hydride being insoluble in the diethyl ether, and reacting at a temperature of about 35 to 75° C., and converting substantially all the lithium chloride to lithium aluminum hydride dissolved in the diethyl ether, and sodium chloride solids, separating the liquid phase, then adding a liquid higher boiling than diethyl ether and of less solvency for the lithium aluminum hydride, said liquid being selected from the group consisting of di-n-butyl ether, toluene, a mixture of di-n-butyl ether and toluene, di-isoamyl ether, di-isopropyl ether, 2,2,3-trimethyl pentane, and benzene, said liquid being in proportions of from about 3 to 10 milliliters per gram of lithium aluminum hydride dissolved in the diethyl ether, then distilling, under a pressure of not over about one atmosphere, a distillate equal to about 85 to about 100 percent by volume of the original diethyl ether charged, and crystallizing lithium aluminum hydride.

References Cited by the Examiner

FOREIGN PATENTS 223,475   8/59   Australia.

OTHER REFERENCES

Chizinsky et al.: "Journal of the American Chemical Society," vol. 77, pages 3164–3165 (1955).

MAURICE A. BRINDISI, *Primary Examiner.*